United States Patent
Tarpill et al.

(10) Patent No.: US 6,427,331 B1
(45) Date of Patent: Aug. 6, 2002

(54) SLITTING AND SHAVING TOOL FOR MESSENGERED CABLE

(75) Inventors: Andrew J. Tarpill, East Haddam; Tadeusz Zagula, Hartford, both of CT (US)

(73) Assignee: Capewell Components Company, LLC, Cromwell, CT (US)

(*) Notice: Subject to any disclaimer, the term of this patent is extended or adjusted under 35 U.S.C. 154(b) by 105 days.

(21) Appl. No.: 09/724,031

(22) Filed: Nov. 28, 2000

(51) Int. Cl.$^7$ ................................................ B21F 13/00
(52) U.S. Cl. ........................ 30/90.8; 30/90.1; 30/90.4; 30/91.2
(58) Field of Search ................................ 30/90.1, 90.4, 30/90.6, 90.8, 91.1, 91.2; 81/9.4

(56) References Cited

U.S. PATENT DOCUMENTS

| | | |
|---|---|---|
| 777,412 A | 12/1904 | Hamel et al. ............. 30/90.6 |
| 2,120,398 A | 6/1938 | Edwards et al. ........... 30/90.6 |
| 2,521,688 A | 9/1950 | Cataldo et al. ........... 30/90.1 |
| 2,683,308 A | 7/1954 | Cook, Jr. .................. 30/91.1 |
| 3,151,510 A | 10/1964 | Bunker et al. ............. 30/90.6 |
| 3,355,803 A | 12/1967 | Hanlon et al. ............. 30/91.1 |
| 3,750,281 A | 8/1973 | Belling ..................... 30/90.8 |
| 3,914,864 A | 10/1975 | Prince ...................... 30/90.6 |
| 4,380,256 A * | 4/1983 | Peterpaul .................. 30/90.8 |
| 4,615,116 A | 10/1986 | Hanson et al. ............. 30/90.4 |
| 4,741,104 A | 5/1988 | Noon ........................ 30/90.4 |
| 4,799,406 A | 1/1989 | Diaz-De-Guerenu-Aguirrebeitia ........... 81/9.4 |
| 4,905,373 A | 3/1990 | Krampe ..................... 30/90.6 |
| 4,947,549 A | 8/1990 | Genovese et al. .......... 30/90.8 |
| 4,958,433 A | 9/1990 | Persson ..................... 30/91.2 |
| 4,979,299 A | 12/1990 | Biegnanski ................ 30/90.1 |
| 5,093,992 A | 3/1992 | Temple, Jr. et al. ....... 30/90.8 |
| 5,295,421 A * | 3/1994 | Mansfield .................. 30/90.1 |
| 5,561,903 A | 10/1996 | Baourbeau ................. 30/90.4 |
| 6,131,289 A | 10/2000 | Tarpill ..................... 30/90.6 |

FOREIGN PATENT DOCUMENTS

DE          3904-323 A    8/1990

OTHER PUBLICATIONS

"Question: What's the Quickest Most Accurate Way to Separate Messengered Cable?" Shortcut by Cable Prep, The Next Generation in Cable Preparation Tools.

* cited by examiner

Primary Examiner—Hwei-Slu Payer
(74) Attorney, Agent, or Firm—Delio & Peterson, LLC

(57) ABSTRACT

A slitting and shaving tool for separating a coaxial cable with a curved outer surface from an adjacent cable connected to it with a web of insulating material. The tool includes a slitting blade for cutting through the web to separate the cables and a shaving blade with a curved cutting edge for shaving off excess web material to leave a smooth cylindrical outer surface on the coaxial cable. The tool is hinged to swing open, allowing the tool to be used at intermediate locations along the length of a messengered cable. A cable guide surface on the tool body has a double radius to accommodate cables that have a slight bend. The shaving blade is adjustable towards and away from the cable being shaved. A relief hole allows the shaved excess web material to exit the tool. The relief hole is specially shaped to make it easy to position the curved cutting edge of the shaving blade correctly by locating it in alignment with the apparent perimeter of the relief hole.

21 Claims, 3 Drawing Sheets

SLITTING AND SHAVING TOOL FOR MESSENGERED CABLE

BACKGROUND OF THE INVENTION

1. Field of the Invention

This invention relates to hand tools used to separate a first cable with a curved outer surface, such as a coaxial cable, from an adjacent cable or wire joined to the first cable by a connecting web of material. More specifically, this invention relates to tools that cut through the attaching web of material and to tools used to shave off excess web material from the curved outer surface of the first cable.

2. Description of Related Art

Coaxial cables are widely used in many different applications, particularly including the distribution of video signals. Although a single coaxial cable can carry a video signal, there are many applications where an additional cable or wire, referred to as the "messenger" is needed.

For long suspended spans, the coaxial cable may be provided with a support wire, attached as a messenger wire to the coaxial cable. Messengered cable of this type commonly has the messenger wire positioned adjacent and parallel to the coaxial cable with both cables being encased in insulating coatings. The two insulated cables are connected together by a web of the same insulating material forming an integral side-by-side coaxial cable and messenger wire support.

In other applications, a second coaxial cable may be desired for redundancy or to increase signal carrying capacity. Multiple cable designs may also have twisted pair or multistrand control wires placed adjacent to coaxial cables. In each of these designs the cables are held in a side-by-side relationship by a web, usually formed out of the same material used to provide the outer cable insulation layer.

To use such cables, the web must be severed for some distance back from the end of the cable to free the coaxial cable from the messenger. This allows a connector to be attached to the coaxial cable. Where the messenger is a support wire, the web may need to be slit at a midpoint of the cable to allow the support wire to be attached to an intermediate support on a long span.

One method of separating the cables is to cut the web with a knife. However, this risks damage to the insulating coating if the knife wanders away from the centerline of the web as the cut is made.

To address this problem, longitudinal slitting devices have been designed that hold a cutting blade in the desired location relative to the cable while the tool is pushed or pulled along the length of the cable by the user to cut the web. In one design, the tool has a cylindrical hole approximately the diameter of the coaxial cable portion. A slot with a width just larger than the thickness of the web extends along the cylindrical hole, allowing the tool to pass over the coaxial portion of the cable while the messenger is still attached to it.

The cylindrical hole of the tool is in contact with and guides along the outer circumference of the coaxial cable portion as the user moves the tool lengthwise along the cable. A flat slitting blade is attached to the tool and positioned approximately tangential to the circumference of the coaxial cable. The blade needs to be positioned sufficiently far from the coaxial cable to avoid damaging it and sufficiently close to avoid leaving a large ridge of excess web material on the cable. Excess web material interferes with the proper attachment of a coaxial connector. It also interferes with the use of industry-standard coaxial cable preparation tools that guide on the expected cylindrical outer surface of the coaxial cable.

To produce an acceptable cut, the web-slitting blade needs to be configured to make a cut that is precisely tangential to the outer perimeter of the coaxial cable. Proper positioning of the single slitting blade relative to the outer curved surface of the coaxial cable is critical. However, It takes a relatively large force to make the first cut through the web. This force, and the fact that the insulation of the cable is slightly resilient, and the blade is relatively thick often causes the initial cut through the web to wander slightly producing further imperfections in the final exterior surface of the coaxial cable. To avoid damaging the coaxial cable insulation, the slitting blade may need to be positioned slightly farther from the true tangential position, however, this increases the size of the ridge of excess web material left by the slitting blade.

A further problem with this type of single blade slitting tool is that it must slide over a free end of the cable. This prevents its use at intermediate positions along the cable where the web must be slit to attach a messenger support wire to an intermediate support position, such as to a support pole on a long span.

To address these problems, yet another type of slitting tool has been developed which uses a slitting blade to make an initial cut through the web and a separate shaving blade to shave off the excess web material left by the initial cut. Further, this design uses a two-piece hinged tool body, which can open to receive the cable, allowing the web to be cut at intermediate points along the length of the cable. An example of a tool with this design is seen in U.S. Pat. No. 6,131,289, owned by the assignee of the present invention. A principal advantage for this tool design is that the initial cut, which may wander slightly, is made closer to the centerline of the web, instead of directly tangential to the coaxial cable. This prevents the initial cut from inadvertently wandering into and damaging the insulation of the coaxial cable. A larger excess of web material can be left, which the shaving cut can then remove with great accuracy along a plane that is tangential to the desired final cylindrical shape for the coaxial cable.

Despite these advances in slitting tool design, the described prior art tools and techniques do not meet all the needs of the industry. A key problem is that both single blade slitting tools and double blade slitting and shaving designs make the final removal cut with a flat blade, whereas the preferred final exterior surface for the coaxial cable is cylindrical. If the slitting or shaving blade is set exactly tangential to the desired external surface, it leaves a very slight longitudinal ridge of excess web material along the cable on both sides of the true tangent line. If the blade is set closer to the coaxial cable, it removes too much material and produces a longitudinal "flat" along the outside of the cable, by slicing along a chord through the circular cable cross section.

This ridge or flat can prevent an electrical connector from being properly attached to the cable or prevent a cable preparation tool from removing the right amount of insulation material prior to attaching the connector. Coaxial connectors and cable preparation tools are designed for use with coaxial cables having a circular, defect-free, cross section. Preparation tools that are used to remove insulation from a portion of the cable often guide their cutting blades on the outer surface of the cable. Such tools rely on the defect-free accuracy of the outer cable surface to ensure that the correct depth of cut is made without damage to the interior conductors in the cable. Connectors often use sealing gaskets intended to make a hermetic seal to the defect-free outer cable surface. Consequently, even if the cable is prepared accurately with a prior art tool, a ridge or flat on the cable may allow moisture to enter the attached connector and cause it to fail.

A final difficulty with prior art tools occurs when they are used on very stiff and inflexible large diameter messengered cables, particularly when such cables have a bend near the end of the cable being prepared. For single blade tools that rely on a single cylindrical hole in the tool body, the curved cable may be impossible to move through the receiving hole. The diameter of the receiving hole in the tool body must be closely dimensioned to match the outer diameter of the coaxial cable to keep the slitting blade in the correct position and a curved cable may tend to jam in the receiving hole.

A related problem also occurs, to a lesser extent, in improved tools having two hinged body halves. In these designs, each half of the body includes half of the receiving hole. Although the cable does not normally jam in either half, it tends to rise up away from the guiding surface and the shaving blade, preventing complete removal of the excess web material and accurate shaving. Because of the shape of the guiding surface on earlier tools, which prevents slightly curved cable from lying flat, and because the shaving blade of earlier tools is not adjustable, it is not always possible to properly shave the surface of the coaxial cable, particularly on a slightly curved or bent cable.

Bearing in mind the problems and deficiencies of the prior art, it is therefore an object of the present invention to provide a combination cable slitting and shaving tool that produces a defect-free cylindrical coaxial cable exterior surface without flats or ridges.

It is another object of the present invention to provide a combination cable slitting and shaving tool that accurately follows and shaves the web from curved and straight coaxial cables without damaging the cable and without leaving any excess web material.

A further object of the invention is to provide a combination cable slitting and shaving tool that remains closed for storage and opens for insertion of the cable and for slitting the web at intermediate locations along the length of a messengered cable.

It is yet another object of the present invention to provide a combination cable slitting and shaving tool that protects the slitting blade when the tool is not in use and that prevents a user from inadvertently contacting the slitting or shaving blades.

Still other objects and advantages of the invention will in part be obvious and will in part be apparent from the specification.

SUMMARY OF THE INVENTION

The above and other objects, which will be apparent to those skilled in art, are achieved in the present invention which is directed to a slitting and shaving tool for separating a first cable with a curved outer surface from a second cable. The tool includes a body and a hinge member, hinged to the body. The body is shaped so that it guides the tool to follow along one side of a web connecting the first cable to the second cable.

The hinge member moves between an open position in which it can receive the first cable and a closed position. The hinge member is shaped to cooperate with the body and guide the hinge member along an opposite side of the web from the body. The body and the hinge member hold a portion of the web between them when the hinge member is moved to the closed position.

The tool includes a slitting blade mounted on the tool and positioned to penetrate the web when the hinge member is moved to the closed position. The slitting blade cuts through the web and separates the first cable from the second cable as the tool is guided along the web by the body and the hinge member. The slitting blade cuts far enough away from the first cable to avoid damaging it and thereby leaves some excess web material on that cable.

The tool also includes a shaving blade with a curved cutting edge. The shaving blade is mounted to the body and shaves off the excess web material from the first cable to leave a smooth, defect-free, curved surface on the exterior of the first cable.

Preferably, the shaving blade is mounted to the body and the slitting blade is mounted on the hinge member. In the most highly preferred embodiment of the invention, the shaving blade is mounted on a ramp at an angle to the axis of the body and can be adjusted by sliding it up and down the ramp to adjust the depth of cut. The body includes a pair of side walls along the sides of the ramp surface that guide the shaving blade during adjustment and preventing it from twisting during shaving of the excess web material.

A spring is connected between the body and the hinge member to urge the hinge member towards the closed position. The body and the hinge member include squeeze tabs on opposite sides of the hinge line between the body and the hinge member to permit the hinge member to be moved to the open position by squeezing the squeeze tabs towards each other.

The body includes a relief hole with a curved perimeter allowing the excess web material shaved by the curved cutting edge to exit the tool. The relief hole is shaped with a curved perimeter so that the curve of the curved shaving blade cutting edge substantially matches the curve of the relief hole perimeter when the shaving blade is correctly adjusted.

The body of the tool includes a curved cable guide surface having a first radius circumferentially close to the shaving blade and a second larger radius circumferentially farther from the shaving blade to accommodate the first cable when the first cable is not straight.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunct with the accompanying drawings in which:

DESCRIPTION OF THE PREFERRED EMBODIMENT(S)

In describing the preferred embodiment of the present invention, reference will be made herein to FIGS. 1–9 of the drawings in which like numerals refer to like features of the invention.

FIGS. 1–4 show a preferred embodiment of a slitting and shaving tool according to the present invention. FIGS. 5–9 illustrate a typical messengered cable that the slitting and shaving tool of the invention can prepare.

Figure 4A:
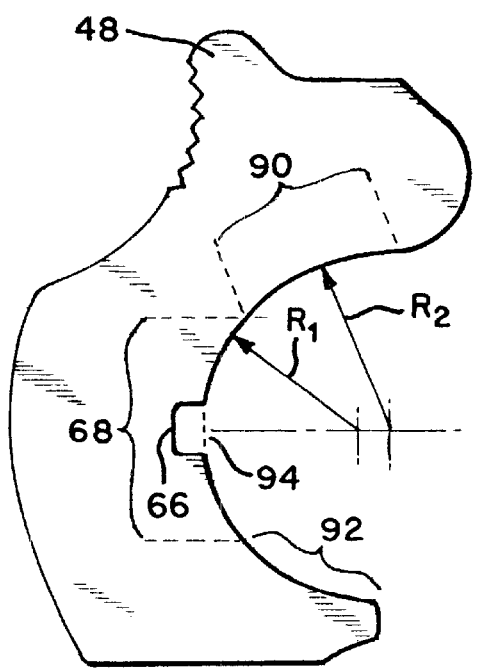
FIG. 4a is a cross sectional view corresponding to FIG. 4 of the extrusion forming the body and hinge member of the present invention showing the double radius portion of the guide surface.
Figure 3:
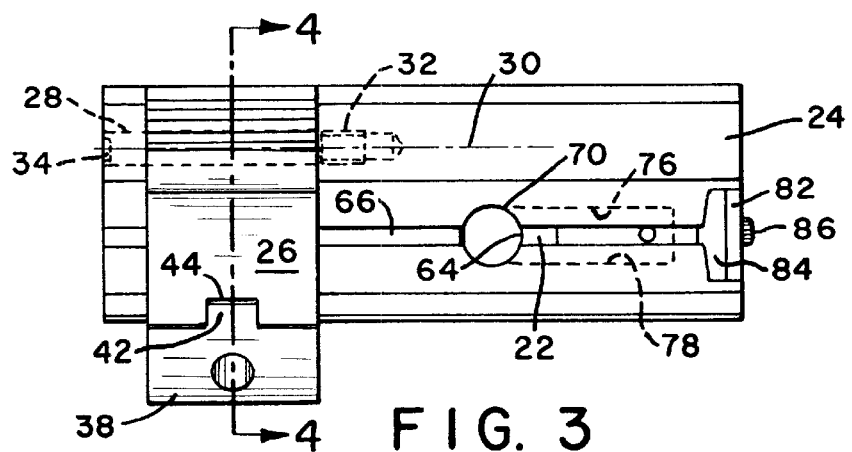
FIG. 3 shows the slitting and shaving tool of the present invention from the bottom relative to FIG. 2.
Figure 4:
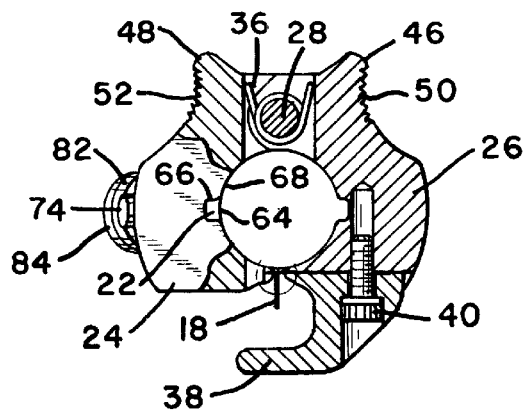
FIG. 4 is a cross-sectional view of the slitting and shaving tool of the present invention, taken along the line 4–4 in FIG. 3.
Figure 5:
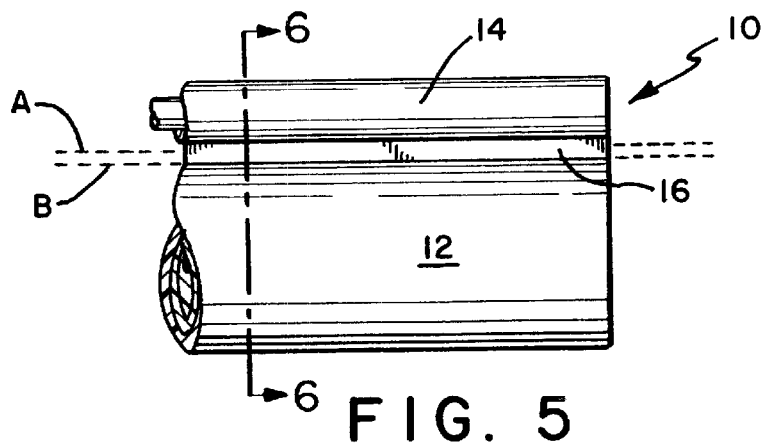
FIG. 5 is a side elevational view of a messengered coaxial cable of a type that may be slit and shaved to the desired shape by the slitting and shaving tool of the present invention.
Figure 6:
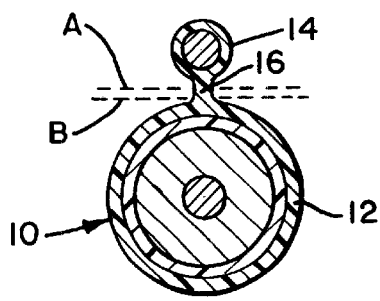
FIG. 6 is a cross sectional view of the messengered coaxial cable seen in FIG. 5 taken along the line 6—6 in FIG. 5.
Figure 7:
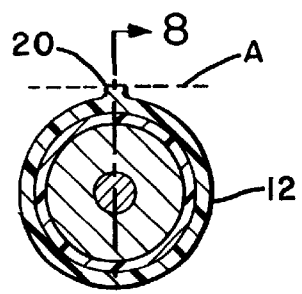
FIG. 7 is a cross sectional view of the messengered coaxial cable, corresponding to the cross sectional view seen in FIG. 6 except that the cable is shown after the slitting cut has been made and before the shaving cut has been made.

To understand the operation of the tool in FIGS. 1–4 it is best to first understand the messengered cable design and the preparation steps to be accomplished by the tool. Referring to FIGS. 5 and 6, a typical messengered cable 10 includes a first cable 12 and a second messenger cable 14. The first cable is a coaxial cable having a curved outer surface. The second cable 14 is a support cable and is connected to the first cable with a web 16 formed of the same insulating material forming the outer insulator on the two cables.

Although FIGS. 5 and 6 show a coaxial cable and a support cable, other types of messengered cables may also be prepared with the tool of this invention. For example, the second cable may be a control cable or another coaxial cable. The tool may also be used with multiple messengered cables, such as triple cables. The tools is particularly adapted for use with video cables that are relatively inflexible where it is difficult to straighten the cable when it is removed from a storage roll.

FIGS. 5 and 6 show two cut lines marked "A" and "B." Cut line A marks the position of a first cut made by a slitting blade 18 (see FIG. 1) having a straight cutting edge. The slitting cut separates the two cables, leaving a ridge 20 (see FIG. 7). Cut line B marks the approximate position of the shaving cut made by shaving blade 22 (see FIG. 2) of the present invention. Cut line B exactly marks the cut line position of prior art single blade slitting tools as well as the position of the shaving cut made by prior art double blade tools. As can be seen in FIG. 6., the cut line B defines a flat plane of the type that would be produced with a slitting or shaving blade having a straight cutting edge. The cutting edge on the shaving blade of the present invention is curved, however. The curve on the shaving blade cutting edge produces a curved shaving cut that exactly matches the exterior curved surface of the coaxial cable.

Figure 8:
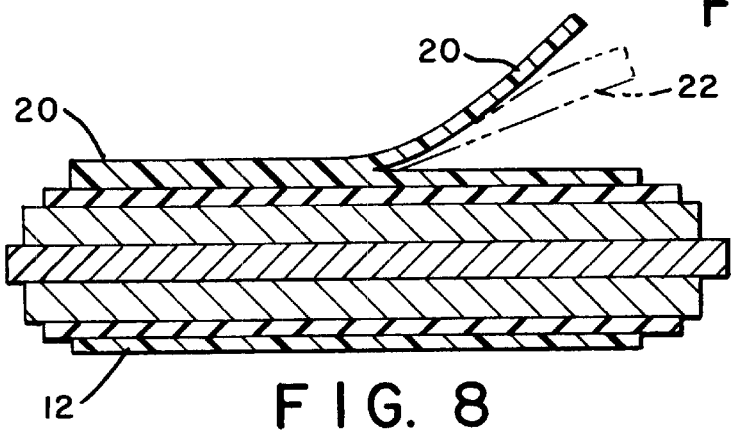
FIG. 8 is a cross sectional view of the messengered coaxial cable seen in FIG. 7 taken along the line 8—8 in FIG. 7, also showing the cable after the slitting cut has been made and before the shaving cut has been made. The shaving blade is shown in phantom corresponding to the position of that blade during the shaving operation.
Figure 9:
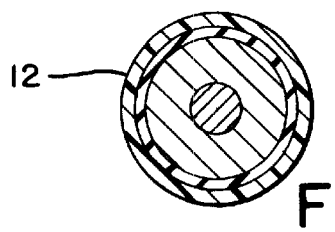
FIG. 9 is a cross sectional view of the messengered coaxial cable, corresponding to the cross sectional view seen in FIG. 7 except that the cable is shown after the shaving cut has been completed to produce a smooth cylindrical defect-free outer surface for the coaxial cable.

As can be seen in FIG. 8, the shaving blade 22 shaves the ridge 20 from the exterior cable 12 to accurately produce a defect free cylindrical outer surface for the coaxial cable 12 as seen in FIG. 9. Once the coaxial cable 12 is separated from the messenger cable 14 and has the desired circular cross section, conventional cable preparation tools can be used to finish preparing the cable so that a coaxial cable connector can be attached.

Figure 1:
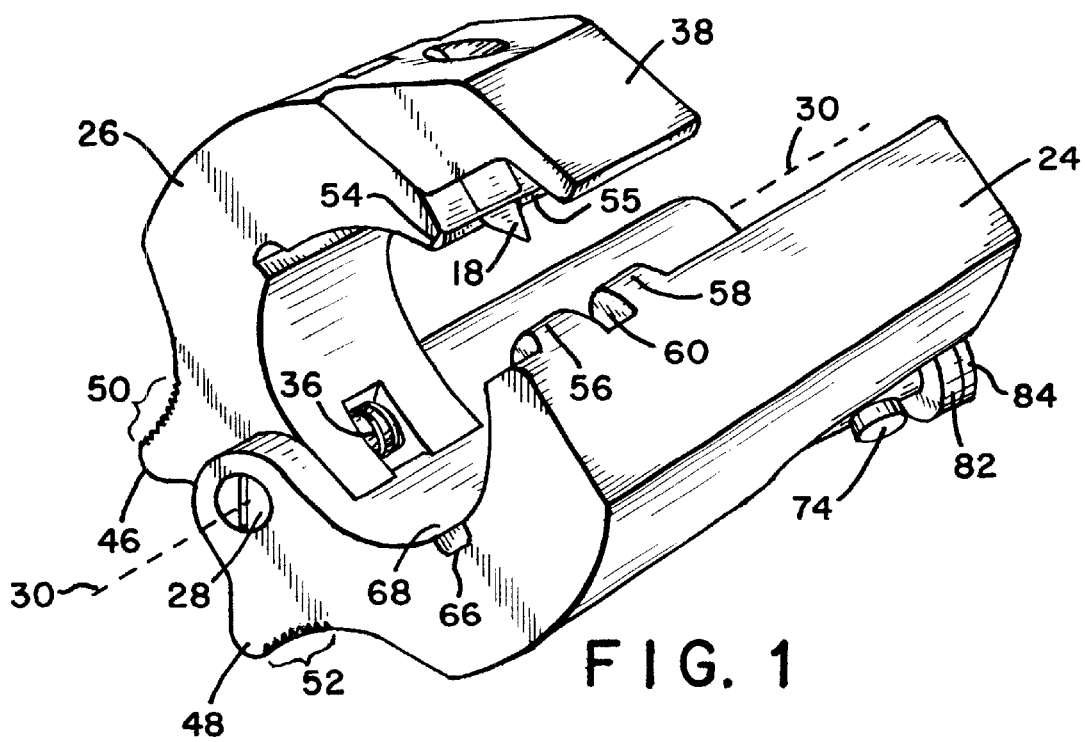
FIG. 1 is a perspective view of a preferred embodiment of the slitting and shaving tool of the present invention.

The slitting and shaving tool of this invention will now be described with reference to FIGS. 1–4. Referring to FIG. 1, the tool includes a body 24 and a hinge member 26. A hinge shaft 28 extends through the body 24 and the hinge member 26 along hinge line 30. An end 32 of the hinge shaft 28 is threaded (see FIG. 3) and the opposite end 34 is slotted (see FIG. 1).

The hinge member 26 moves between an open position and a closed position. FIG. 1 shows the tool partially open. FIG. 4 shows the tool closed. A spring 36 biases the hinge member 26 towards the closed position. The hinge member 26 includes an optional blade guard 38. The spring 36 keeps the tool closed so that the slitting blade 1 8 is protected when the tool is being stored. The blade guard 38 helps cover the slitting blade 18, however alternative designs may reduce its size to allow the tool to be used with messengered cables where the messenger cable is larger or wider than the cable shown in FIGS. 5–9.

The blade 18 is preferably mounted between the blade guard 38 and the hinge member 26 with a mounting bolt 40 (see FIG. 4). Mounting bolt 40 also holds the blade guard 38 in position. As can be seen in FIG. 3, the blade guard 38 includes a projecting ridge 42 engaged by a corresponding slot 44 in the hinge member. The slitting blade 18 has a width that matches the width of slot 44. The slot holds the slitting blade 1 8 and prevents both the blade and the blade guard 38 from rotating about the single attachment point bolt 40.

The hinge member 26 is provided with a squeeze tab 46 and the body 24 is provided with a squeeze tab 48. The two squeeze tabs are provided with friction surfaces 50, 52. The tabs are located on the opposite side of the hinge line 30 from the body 24 and hinge member 26 such that when the tabs 46, 48 are squeezed or pinched together by a user, the hinge member and body move apart to open the tool. The tool may also be opened by swinging up on the blade guard 38 against the closing force of spring 36.

The hinge member 26 is provided with a guide projection 54 that is directly opposite a corresponding guide projection 56 on the body 24. Guide projection 54 is adjacent to slitting blade 18 and is shaped as a blunted V to fit into the valley formed by the web 16 and the adjacent portions of cables 12 and 14. Its opposite guide projection 56 on the body 24 is identically shaped to ride on the opposite side of the web 16 when the tool is closed around the cable 12.

A corresponding guide projection 55 is located on the hinge member 26 on the opposite side of slitting blade 18. Guide projection 55 on the hinge member is directly opposite guide projection 58 on the body 24. These two guide projections 55, 58 act in the same way as the pair of guide projections 54, 56 to trap the web 16 between them and guide the tool so that slitting blade 18 lies in cutting plane A near the center of the web and slits the web to separate the cables 12, 14 without damaging the insulation on either cable.

The guide projection 56, 58 on the body define a notch 60 between them for receiving the slitting blade 1 8. For the preparation of one end of the cable, the tool is typically positioned at a distance from the end of cable and opened to encircle coaxial cable 12. As the hinge member 26 is moved towards the closed position, the slitting blade 18 pierces web 16. The tool is then drawn towards the free end of the cable separating the messenger cable 14 from the coaxial cable 12 along plane A. This leaves the coaxial cable cross section seen in FIG. 7 with a ridge 20 of excess web material.

It will be understood that the messenger cable 14 normally remains connected to coaxial cable 12 at the point where the initial penetration through the web was made. The user of the tool will use the slitting function of the tool to cut through a sufficient length of the web so that the messenger cable is well separated from the coaxial cable. This allows the tool of this invention to be inserted between the two cables so that the shaving operation can be completed and allows additional tools to be used to prepare the cable and attach the desired coaxial cable connector.

Figure 2:
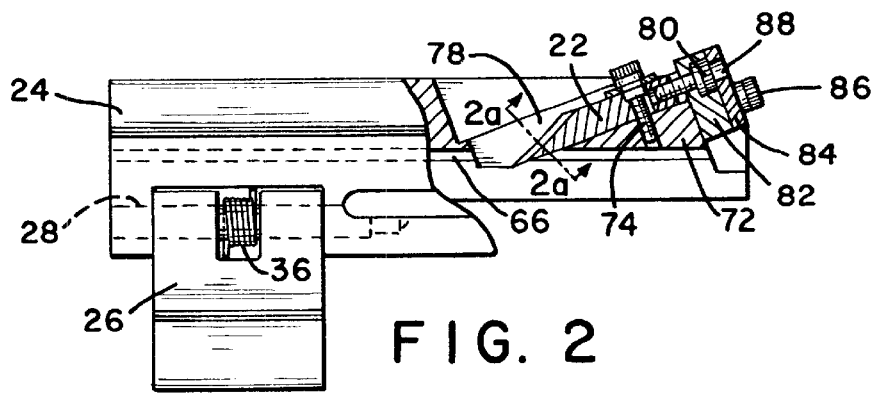
FIG. 2 is a back elevational view of the slitting and shaving tool of the present invention, with portions being cut away and shown in cross section to illustrate the shaving blade and associated adjustment mechanism. The tool has been rotated relative to FIG. 1 to bring the shaving blade from the bottom to the top.
Figure 2A:
FIG. 2a is a cross sectional view through the shaving blade taken along the line 2a—2a of FIG. 2 showing the gullet grinding of the shaving blade that produces the curved cutting edge of the shaving blade.

FIGS. 2 and 2a show the shaving blade 22 of the tool that shaves away the excess web material to produce the desired smooth cylindrical exterior surface for the coaxial cable. The shaving blade is preferably constructed out of tool steel having a rectangular bar stock cross section. The shaving blade includes a gullet 62, preferably produced by grinding, that forms a curved cutting edge 64 (see Figs. 3 and 4). FIG. 2a is a cross section of the shaving blade only, taken perpendicular to the axis of the ground gullet 62.

The grinding of the gullet 62 produces a curved cutting edge 64 that closely matches the curvature of the outer surface of coaxial cable 12 to produce the desired defect-free surface shown in FIG. 9. As can be seen in FIG. 4, the shaving blade 22 is positioned so that the curved cutting edge 64 lies tangential to the radiused inner surface 68 on the body 24 and projects above longitudinal notch 66 formed in guide surface 68.

After the slitting cut is made, the tool is rotated ninety degrees about its own axis so that the ridge 20 of excess web material is engaged by notch 66 and the exterior surface of the coaxial cable lies in contact with the inner cable guide surface 68. This positions the curved cutting edge 64 in the desired location to shave off the ridge of web material. The tool is then drawn along the cable and the shaving blade shaves off the excess web material, which exits the tool through relief hole 70 (see FIG. 3).

FIG. 2 shows the adjustable mounting for the shaving blade 22. The shaving blade is supported on a ramp 72 in a manner similar to the mounting of the blade in a block plane. The shaving blade is slidable along the ramp allowing the blade to be adjusted. Sliding the blade down the ramp, towards the coaxial cable, allows it to take a deeper cut. Sliding the blade up the ramp, away from the coaxial cable, makes a shallower cut. When the shaving blade is in the correct position, clamping screw 74, which projects through an opening in the shaving blade 22, is tightened to securely clamp the shaving blade to the supporting ramp. The shaving blade 22 is held in alignment between a pair of sidewalls 76, 78 so that it can only slide axially along the ramp and cannot rotate or pivot about the clamping screw 74.

To allow minute adjustment of the position of the shaving blade along the ramp, an adjustment screw 80 is provided. The adjustment screw 80 is threaded into the back end of the shaving blade 22 and the head of screw 80 is captured between base block 82 and plate 84. Screw 86 holds the base block 82 and the plate 84 to the body 24. The head of adjustment screw 80 is free to turn under the plate 84. Opening 88 in plate 84 allows an Allen wrench adjustment tool to penetrate the plate 84 and turn adjustment screw 80. When the clamping screw 74 is loosened, rotating the adjustment screw will smoothly slide the shaving blade 22 slides up or down ramp 72.

As can be seen in FIG. 3, relief hole 70 is specially shaped with a curved perimeter on the side near the shaving blade 22. The curved perimeter is designed so that the curved cutting edge 64 of the shaving blade is congruent with and substantially matches the curve of the relief hole perimeter when the shaving blade is correctly positioned. This makes it relatively quick and easy to install and adjust the shaving blade to the correct location by sighting through the relief hole from the orientation seen in FIG. 3. Adjustment is correct when the curved cutting edge 64 of the shaving blade is aligned with the curve of the relief hole perimeter.

The body 24 and hinge member 26 are preferably formed from an extrusion having the same cross section. FIG. 4a shows a cross section of the extrusion forming the body 24. The inner surface 68 extends on both sides of groove 66 and has a radius $R_1$ that is less than the radius $R_2$ of the surfaces 90 and 92 located on either side of region 68. The radius $R_1$ approximately corresponds to the radius of the coaxial cable 12.

When the shaving blade 22 is in the correct adjusted position, its curved cutting edge 64 is aligned with dashed line 94 in FIG. 4a to shave away any excess web material 20 extending into groove 66. The limited width of the $R_1$ radius section 68 assures that the cable will easily lie flat against surface 68 so that the shaving will occur correctly. The larger radius $R_2$ of surfaces 90 and 92 provides clearance for the cable, which may have a slight bend or curvature, particularly bends or curves produced by prior storage on a cylindrical storage reel. The double radius section $R_1$, $R_2$ provides clearance for this curvature and ensures that the coaxial cable will not bind against surfaces 90 or 92 and will lie flat against surface 68.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A slitting and shaving tool for separating a first cable with a curved outer surface from a second cable, the tool comprising:

a body shaped to guide the body of the tool to follow along one side of a web connecting the first cable to the second cable;

a hinge member hingedly attached to the body for motion between an open position and a closed position, the hinge member being shaped to cooperate with the body and guide the hinge member along an opposite side of the web from the body, the body and the hinge member holding a portion of the web therebetween when the hinge member is moved to the closed position; and a slitting blade mounted on the tool and positioned to penetrate the web when the hinge member is moved to the closed position and to slit the web and separate the first cable from the second cable as the tool is guided along the web by the body and the hinge member, the slitting blade leaving excess web material on the first cable;

a shaving blade with a curved cutting edge, the shaving blade being mounted to the body for shaving the excess web material from the first cable after the first cable has been separated from the second cable, the curved cutting edge removing the excess web material from the first cable along a curve to substantially match the curved outer surface of the first cable.

2. The slitting and shaving tool of claim 1 wherein the body defines an axis parallel to the axis of the first cable and the shaving blade is mounted at an angle to the axis of the body.

3. The slitting and shaving tool of claim 2 wherein the shaving blade is adjustable relative to the axis of the tool.

4. The slitting and shaving tool of claim 2 wherein the body includes a ramp surface and the shaving blade is mounted to the ramp surface.

5. The slitting and shaving tool of claim 4 wherein the shaving blade is adjustably slidable along the ramp surface and the tool further includes a clamp for clamping the shaving blade to the ramp surface.

6. The slitting and shaving tool of claim 5 wherein the clamp comprises a clamping bolt for securely clamping the shaving blade to the ramp surface and preventing sliding motion therebetween.

7. The slitting and shaving tool of claim 5 wherein the body further includes a guide surface along the ramp surface for guiding the shaving blade as it slides along the ramp surface during adjustment.

8. The slitting and shaving tool of claim 7 wherein the guide surface comprises a first side wall along an edge of the ramp surface.

9. The slitting and shaving tool of claim 8 further including a second side wall along an opposite edge of the ramp surface from the first side wall, the first and second side walls cooperating with the ramp surface to form an angled channel closely receiving the shaving blade, the angled channel guiding the shaving blade during adjustment and preventing the shaving blade from twisting during shaving of the excess web material.

10. The slitting and shaving tool of claim 1 wherein the shaving blade is adjustable to move the curved cutting edge of the shaving blade towards and away from the first cable.

11. The slitting and shaving tool of claim 10 further including an adjustment drive for precisely moving the curved cutting edge of the shaving blade towards and away from the first cable.

12. The slitting and shaving tool of claim 11 wherein the adjustment drive comprises an adjustment screw.

13. The slitting and shaving tool of claim 1 further including a spring biased to urge the hinge member towards the closed position.

14. The slitting and shaving tool of claim 1 further including a blade guard for the slitting blade.

15. The slitting and shaving tool of claim 1 wherein the body includes a first squeeze tab and the hinge member includes a second squeeze tab, the squeeze tabs being placed on an opposite side of a hinge line between the body and the hinge member to permit the hinge member to be moved to the open position by squeezing the squeeze tabs towards each other.

16. The slitting and shaving tool of claim 1 wherein the shaving blade includes a gullet defining the curved cutting edge.

17. The slitting and shaving tool of claim 1 wherein the body includes a relief hole allowing the excess web material shaved by the curved cutting edge to exit the tool.

18. The slitting and shaving tool of claim 17 wherein the shaving blade is adjustable and the perimeter of the relief hole is curved, the curve of the curved shaving blade cutting edge substantially matching the curve of the relief hole perimeter when the shaving blade is correctly adjusted.

19. The slitting and shaving tool of claim 1 wherein the body includes a curved cable guide surface for receiving the first cable, the cable guide surface accommodating the first cable when the first cable is not straight.

20. The slitting and shaving tool of claim 19 wherein the cable guide surface has a first radius circumferentially close to the shaving blade and a second larger radius circumferentially farther from the shaving blade to accommodate the first cable when the first cable is not straight.

21. The slitting and shaving tool of claim 19 wherein the cable guide surface includes a longitudinal notch for receiving the excess web material and for guiding the excess web material into shaving contact with the shaving blade.

* * * * *